3,842,007
FIBROUS CELLULOSE ACETATE FILTER MATERIAL

Arthur Caputi, Jr., and Thomas C. Wong, Modesto, Calif., assignors to E. & J. Winery, Modesto, Calif.
No Drawing. Filed Feb. 15, 1973, Ser. No. 332,640
Int. Cl. B01d 37/00
U.S. Cl. 210—65                                           10 Claims

ABSTRACT OF THE DISCLOSURE

Fibrous cellulose acetate resembling asbestos in fiber structure comprising rod-shaped fibers intermingled with fine, fluffy filaments and having a surface area in the range of about 35 m.$^2$/g. and about 55 m.$^2$/g. This fibrous cellulose acetate is useful as a filter material for filtering liquids and is made by precipitating cellulose acetate having a viscosity betwen 25 secs. and 45 secs. from a 2–4 wt. percent solution in an organic solvent of intermediate polarity with a precipitant liquid, the volume ratio of precipitant liquid to solution being about 3:1 to about 10:1.

BACKGROUND OF THE INVENTION

Field of the Invention

This invention relates to a new form of fibrous cellulose acetate which resembles asbestos in fibrous structure and is useful as a filter medium for filtering liquids.

Description of the Prior Art

Asbestos which has a large surface area per unit weight and consists of very fine, fluffy filaments intermingled with larger fibers is an excellent filter medium for liquids. Because such asbestos has excellent filtering properties it has been prevalently used to filter potable liquids such as fruit juices, vegetable juices, wine and the like. However, asbestos has recently been suspected of contributing to or causing injurious effects upon human health and, accordingly, its users have been fervently searching for an adequate substitute filter material.

A new form of cellulose acetate has now been found which has a fibrous structure resembling asbestos and filtering properties equal to or better than asbestos. Cellulose acetate is odorless and tasteless and, to the best of present knowledge, is completely nontoxic to humans and other life forms. It is presently use in large amounts for packaging food products. Various forms of it have been used for cigarette filters—U.S. 3,420,245 reporting such use of hairy cellulose acetate particles of fairly high surface area.

SUMMARY OF THE INVENTION

The cellulose acetate of this invention is fibrous in form and comprises rod-shaped fibers intermingled with fine, fluffy filaments. In an aqueous suspension it looks similar to cotton fibers—light and fluffy. However, microscopically it more closely resembles asbestos; that is, it forms a random matrix of fine, fluffy filaments backboned by larger fibrils. The diameters of these fibrils and filaments range from about 0.5 microns to about 50 microns and the surface area [1] of the dried fibrous mass is in the range of about 35 m.$^2$/g. and about 55 m.$^2$/g., which is slightly greater than asbestos.

This unique form of fibrous cellulose acetate is made by precipitating cellulose acetate of a particular viscosity from a low concentration solution. All values of viscosity in this application are as measured in accordance with ASTM D1343-69. Commercial grade cellulose acetate in either powder or flake form, preferably powder, with a viscosity (as measured by ASTM D1343-69) in the range of about 25 secs. to about 45 secs. may be used to make this fibrous cellulose acetate. Cellulose acetates with viscosities significantly less than 25 secs. produced fibers that were too soft and powdery. Such fibers were easily compressed when used as a filter medium, resulting in prohibitively low liquid flow rates. Cellulose acetates of viscosity greater than about 45 secs. produced coarse fibers which did not form a fine, tight filter matrix capable of effecting a high degree of filtration. The acetyl content of the cellulose acetate is believed to have no significant affect on fiber formation. However, for solubility reasons cellulose acetates having acetyl contents in the range of between about 37% and about 40% by weight are preferred. Such cellulose acetates are dissolved in a suitable organic solvent of intermediate polarity such as acetone, acetic acid, methyl acetate and 1,4-dioxane to a 2–4% by weight concentration. Other solvents such as ethyl acetate, nitroethane and ethyl dichloride which, by themselves, are not suitable, may be used if mixed with alcohol. Preferably the solution is approximately 3% by weight cellulose acetate.

Precipitation of the fluffy cellulose acetate from such solutions may be achieved by adding a cellulose acetate precipitant (i.e., a nonsolvent for cellulose acetate such as water) to the solution with agitation or by adding the solution to the precipitant with agitation. Preferably a large volume of precipitant relative to the volume of solution is used and it is added quickly to the solution to produce a good turbulence without mechanical agitation. It has been found that precipitant: solution volume ratios in the range of 3:1 and 10:1 give a suitable precipitate. In the specific case of using acetone as a solvent and water as the precipitant it was found that ratios of less than about 3:1 gave a gelatinous rather than a fibrous precipitate. In this specific acetone: water system volume ratios above 10:1 produced coarse fibers which were generally unsuitable for filtering. Preferably the volume ratio is between 5:1 and 8:1, inclusive.

The temperature at which the precipitation is carried out is generally not critical. However, excessively low temperatures may cause gelling and excessively high temperatures may drive off solvent and change the concentration balance in the process. Accordingly, temperatures in the range of ±5° F. of ambient temperature are preferred.

The fluffy cellulose acetate precipitate forms instantaneously when the precipitant is mixed with the cellulose acetate solution. Sight variations in the precipitation process, e.g., addition rate, degree of turbulence, solution concentration etc., may cause the average fiber size to vary slightly from batch to batch. Accordingly, it is desirable to disperse and partially disintegrate the precipitate by mechanical means after precipitation is complete to insure a relatively uniform fiber size is obtained. This may be accomplished by stirring a slurry of the precipitate with a propeller-type stirrer or other shearing means. It has been found that the amount of dispersion and disintegration depends upon the relative sizes of the mixing vessel and stirrer blade, the slurry concentration and the stirring rate and time. High slurry concentrations, high stirring rates, long stirring times and low mixing vessel size to stirrer blade size ratio favor greater dispersion and disintegration. As indicated above surfaecs areas of about 35 to 55 m.$^2$/g. are desirable; therefore sufficient stirring to provide such areas should be effected. Excessive stirring will adversely affect the ability of the precipitate to form a porous matrix suitable for filtering liquids.

---
[1] As measured in accordance with "Determination of Surface Area Adsorption Measurements by a Continuous Flow Method" by F. M. Nelson and F. T. Eggertsent, Vol. 30, No. 8, August 1958, Analytical Chemistry, pp. 1387–1390.

Unlike asbestos fibers the fluffy cellulose acetate of this invention cannot be dried without destroying its fluffiness and usefulness as a filter material. Therefore, once it is made it must be stored in a "wet state," preferably as a wet cake comprising at least 70% nonsolvent for cellulose acetate. In order to keep it wet over prolonged storage the cake should be kept in containers from which the nonsolvent will not evaporate quickly. For instance, the filtering properties of a wet cake of fluffy cellulose acetate (>70% by weight water) were unaffected after prolonged storage in polyethylene bags.

EXAMPLES

The following examples illustrate the fluffy cellulose of this invention, its method of manufacture and its use as a filtering material in comparison to asbestos and in comparison to the cellulose acetate of U.S. 3,420,245. These examples are not intended to limit the scope of the invention, as otherwise described and claimed herein, in any manner.

Example 1

3 g. of cellulose acetate powder (Eastman Kodak, 38.3% by weight acetyl, viscosity 40 secs. by ASTM D1343–69) was added to 100 ml. acetone in a vessel with stirring to avoid lumping. This mixture was stirred until a homogeneous solution was obtained. 500 ml. of water was then poured quickly into this homogenous solution causing a fibrous precipitate to form instantaneously. The entire contents of the vessel were poured onto a 100 mesh wire screen and the precipitate retained by the screen was washed with running water until it was acetone-free. A 2% by weight aqueous slurry of the precipitate was formed and placed in a 15 cm. in diameter stirring vessel equipped with a 5 cm. diameter propeller type stirrer and stirred at 2800 r.p.m. for 20 minutes. The slurry was then suction filtered to form a wet cake of cellulose acetate (78.9% moisture). The surface area[1] of the dried cellulose acetate was measured at 50 m.$^2$/g.

A small portion of this wet cake was suspended in a small volume of water. In this aqueous suspension the fibers of the precipitate appeared light and fluffy and resembled cotton fibers. This suspension was placed in a petri dish and observed under a dissecting microscope. The precipitate appeared as a matrix of fine, fluffy filaments backboned by larger fibrils—very similar to the fibrous structure of asbestos. Filament and fibril diameters were measured microscopically and found to range between 0.5 microns and 50 microns.

Example 2

A fibrous cellulose acetate precipitate was formed using the method of Example 1 except that a solution of 2 g. of cellulose acetate in 100 ml. acetone was employed. The fibrous structure of the resulting precipitate was essentially identical to the precipitate of Example 1.

Example 3

A fibrous cellulose acetate precipitate was formed using the method of Example 1 except that a solution of 4 g. of cellulose acetate in 100 ml. of acetone was employed. The resulting precipitate had a fibrous structure essentially identical to that of Example 1.

Example 4

A cellulose acetate precipitate was prepared by the method of Example 1, except that acetone was replaced by 1,4-dioxane for dissolving the cellulose acetate. The precipitated cellulose acetate filaments and fibers were essentially identical to those of Example 1.

Example 5

A cellulose acetate precipitate was prepared by the method of Example 1, except that acetone was replaced by methyl acetate for dissolving the cellulose acetate. The precipitated cellulose acetate filaments and fibers were essentially identical to those of Example 1.

The filtering abilities of the precipitates of each of Examples 1–5 were tested using the following procedure. A standard turbidity curve was prepared by filtering 100 ml. dry white wine through a 0.1 micron Millipore membrane filter, adding various amounts (1–10 p.p.m.) of $SiO_2$ to portions of the filtrate, measuring the turbidity of the $SiO_2$-containing portions with a Beckman model DU Spectrophotometer with matched 1 cm. cells at 500 nanometers and plotting the results (turbidity vs. p.p.m. $SiO_2$).

A suspension of each cellulose acetate precipitate in the same dry, white wine was made (0.3 g. cellulose acetate/ 100 ml. wine) and the precipitate was coated uniformly onto a Whatman No. 1 paper, 9.0 cm. in diameter, from the suspension. The coated paper was mounted on a Millipore filter apparatus, 3.8 cm. in diameter. 100 ml. of the same dry, white wine containing 1000 p.p.m. carbon particles (0.5 micron diameter) was then filtered through the coated paper and the turbidity of the filtrate was measured as above. (The filtrates of Examples 4 and 5 were measured by Tyndall light only as described below.) These measurements, reported on the basis of the p.p.m.'s of $SiO_2$ required to give the same turbidity, appear in Table I below. Each filtrate was also observed with a Tyndall light.

Table I

| Example No.: | Turbidity (p.p.m. $SiO_2$) |
|---|---|
| 1 | <1 |
| 2 [1] | <1 |
| 3 [2] | <1 |
| 4 | no turbidity viewed with Tyndall light |
| 5 | no turbidity viewed with Tyndall light |

[1] Flow rate was slow due to compaction of matrix—indicating "tender" fibers.
[2] Matrix was sandy when rubbed between fingers—indicating fiber coarseness.

The effectiveness of the cellulose acetate of this invention for filtering various liquids (carbon added only as indicated) as compared to asbestos was determined using the procedure described above. For red wines, turbidity was measured with a Turner model 110 Fluorometer with a 1 cm. square cuvette and a No. 25 (red) filter at a slit setting of 30X. These tests are reported in Table II.

TABLE II

| Test liquid | Turbidity (p.p.m. $SiO_2$) | |
|---|---|---|
| | Cellulose acetate | Asbestos |
| Dry white wine | <1 | <1 |
| Dry dark red wine | <1 | <1 |
| Dry white wine plus 1000 p.p.m. carbon particles (size ≈0.5µ) | <1 | <1 |
| Concord wine (6% v./v. solid) | 0 | 0 |
| Concord juice (20° B., 19% v./v. solid) | 0 | 0 |
| Orange juice (13° B., 5% v./v. solid) | <1 | 6 |
| Pineapple juice (13° B., 5% v./v. solid) | <1 | 5 |
| Sucrose solution (66° B) plus 1000 p.p.m. carbon particles (size ≈0.5µ) | <1 | <1 |
| 0.1% yeast solution | 0 | 0 |
| 0.1% bentonite solution | 0 | 0 |

As can be seen in Table II, on an equal weight basis, the fluffy cellulose acetate had the same filtering ability as asbestos. In fact, cellulose acetate clarified fruit juices better than asbestos.

The cellulose acetate of U.S. 3,420,245 was also tried as a liquid filter material for comparison purposes. It was prepared according to the method described in U.S. Pat. No. 3,420,245, passed through a 60 mesh screen and placed in water. It did not disperse and repeated attempts to mechanically disperse it were generally unsuccessful. Accordingly, it did not coat the filter paper support uniformly and was therefore ineffective in filtration tests.

As illustrated by the above filter tests, in using the fluffy cellulose as a filter it is taken from its stored form, e.g., a wet cake, and dispersed in a small amount of the liquid to be filtered with stirring. The dispersed cellulose acetate is coated onto a suitable filter support such as wire screen, cloth, paper or porous ceramic from the dispersion by pouring the dispersion uniformly over the support. The amount used will usually be approximately 24 g. (dry weight) per square ft. in most instances. The liquid that drains from the coated support (liquid to be filtered contaminated with the nonsolvent in which the cellulose acetate stored) is discarded and filtration proceeds as usual. If the cellulose acetate of this invention may be reused by peeling it off the filter support, suspending it in water with agitation, allowing the precipitate to settle and siphoning off the hazy liquid. It is estimated that 70-80% of the solid contaminants may be removed in this manner. If further purification is desired the cellulose acetate may be redissolved in acetone, the solution filtered and the cellulose acetate precipitated from the filtrate.

In the above filter tests it was observed that the flow rates of the liquids through the fluffy cellulose acetate filter were slower than the flow rates through asbestos. It has been found that blending linear fibers of cellulose (commercially available) with the fluffy cellulose acetate improved flow rates substantially with no measurable change in filtering power. If desired the fluffy cellulose acetate of this invention may be blended with other filter materials such as glass wool and diatomaceous earth to provide materials with varying flow rates and filter properties.

Modifications of the above described invention which are obvious to those of ordinary skill in the chemical composition and process arts are intended to be within the scope of the following claims.

We claim:

1. A fibrous cellulose acetate resembling asbestos in fibrous structure and comprising rod-shaped fibers intermingled with fluffy filaments said fibers and filaments having diameters of about 0.5 microns to about 50 microns, and a surface area of about 35 $m.^2/g.$ to about 55 $m.^2/g.$, said fibrous cellulose acetate being wet with at least about 70% by weight nonsolvent for cellulose acetate.

2. A filter for filtering liquids which do not decompose or dissolve cellulose acetate comprising:
    (a) a porous, solid support; and
    (b) a uniform layer of the fibrous cellulose acetate of claim 1 on said support.

3. A method for filtering suspended solids from a liquid which does not decompose or dissolve cellulose acetate comprising passing said liquid through a layer of the fibrous cellulose acetate of claim 1.

4. The method of claim 3 wherein said liquid is fruit juice or wine.

5. A method for making a fibrous cellulose acetate resembling asbestos in fibrous structure and useful for filtering liquids which do not decompose or dissolve cellulose acetate comprising:

(a) dissolving cellulose acetate having a viscosity of about 25 secs. to about 45 secs. in an organic solvent of intermediate polarity to a concentration of about 2% to about 4% by weight;
(b) precipitating cellulose acetate from the resulting solution by adding a precipitant liquid thereto under conditions of turbulence, the volume ratio of precipitant liquid to solution being in the range of about 3:1 and 10:1; and
(c) maintaining the resulting precipitate under conditions in which it is wet with at least about 70% by weight nonsolvent for cellulose acetate for maintaining desired surface area and a fibrous structure resembling that of asbestos.

6. The method according to claim 5 including:
(a) after precipitating cellulose acetate from the resulting solution, dispersing a slurry of the precipitate with mechanical means until the surface area of the precipitate is in the range of about 35 $m.^2/g.$ to about 55 $m.^2/g.$ 7. The method according to claim 5 wherein said organic solvent is acetone and said precipitant liquid is water.

8. The method according to claim 5 wherein the volume ratio of precipitant liquid to solution is 5:1 to 8:1.

9. The method according to claim 5 wherein said organic solvent is acetone, the concentration of said solution is approximately 3% by weight, said precipitant liquid is water; the volume ratio of precipitant liquid to solution is 5:1 to 8:1 and said nonsolvent for cellulose acetate is water.

10. A method for making the fibrous cellulose acetate of Claim 1, comprising:
(a) dissolving cellulose acetate having a viscosity of about 25 secs. to about 45 secs. in an organic solvent of intermediate polarity to a concentration of about 2% to about 4% by weight;
(b) precipitating cellulose acetate from the resulting solution by adding a precipitant, liquid thereto, the volume ratio of precipitant liquid to solution being in the range of about 3:1 and 10:1; and
(c) maintaining the resulting precipitate under conditions in which it is wet with at least about 70% by weight nonsolvent for cellulose acetate.

References Cited
UNITED STATES PATENTS

| | | | |
|---|---|---|---|
| 3,573,158 | 3/1971 | Pall et al. | 210—505 |
| 2,144,781 | 1/1939 | Seitz | 210—505 |
| 3,615,024 | 10/1971 | Michaels | 210—490 |
| 3,420,245 | 1/1969 | Kiefer et al. | 260—237 |

OTHER REFERENCES

Hackh's Chemical Dictionary, 4th edition, p. 572.

FRANK A. SPEAR, JR., Primary Examiner

F. H. LANDER, Assistant Examiner

U.S. Cl. X.R.

210—490, 500; 260—227

PO-1050
(5/69)

UNITED STATES PATENT OFFICE
CERTIFICATE OF CORRECTION

Patent No. 3,842,007          Dated October 15, 1974

Inventor(s) Arthur Caputi, Jr., and Thomas C. Wong

It is certified that error appears in the above-identified patent and that said Letters Patent are hereby corrected as shown below:

Column 1, line 47, "use" should read --used--; line 63, "and" should read --to--.

Column 2, line 1, "DI343-69" should read --D1343-69--; line 19, "and" should read --or--; line 21, "ethyl" should read --ethylene--; line 34, "and" should read --to--; line 52, "Sight" should read --Slight--; line 67, "surfaecs" should read --surface--.

Column 3, line 14, after "cellulose", --acetate-- should be inserted.

Column 4, line 25, "p.p.m.'s" should read --p.p.m.--.

Column 5, line 13, after "if", --desired-- should be inserted; line 30, "and" should read --or--.

Column 6, line 9, "and", first occurence, should read --to--; line 41, "and" should read --to--.

Signed and sealed this 10th day of June 1975.

(SEAL)
Attest:

RUTH C. MASON
Attesting Officer

C. MARSHALL DANN
Commissioner of Patents
and Trademarks